United States Patent [19]

Cameron

[11] Patent Number: 5,215,561
[45] Date of Patent: Jun. 1, 1993

[54] MOISTURE COLLECTION APPARATUS

[76] Inventor: Jerry Cameron, 130 Annabelle La., Sequim, Wash. 98382

[21] Appl. No.: 841,103

[22] Filed: Feb. 25, 1992

[51] Int. Cl.$^5$ .............................................. B01D 39/00
[52] U.S. Cl. ........................................ 55/281; 55/388
[58] Field of Search ........................ 55/281, 388, 221

[56] References Cited

U.S. PATENT DOCUMENTS

| | | | |
|---|---|---|---|
| 913,325 | 2/1909 | Touzimsky | 55/281 |
| 2,306,674 | 12/1942 | Todd et al. | 183/4 |
| 2,341,893 | 2/1944 | Baker | 55/281 |
| 2,556,910 | 6/1951 | Feldman et al. | 299/20 |
| 2,680,355 | 6/1954 | Colomb | 62/140 |
| 3,050,920 | 8/1962 | Norton | 55/280 |

Primary Examiner—Bernard Nozick
Attorney, Agent, or Firm—Henderson & Sturm

[57] ABSTRACT

An improved moisture collecting apparatus (10) including a mass of absorbent crystals (50) contained within a screened receptacle unit (13) suspended above a lower housing member (20) which forms a liquid reservoir (100); wherein, a vapor barrier unit (12) having an aperture (32) is disposed intermediate the fluid reservoir (100) and an upper housing member (40) to allow condensed liquid to flow into the liquid reservoir (100) but limit the return passage of water vapor back onto the surface area of the mass of crystals.

5 Claims, 2 Drawing Sheets

MOISTURE COLLECTION APPARATUS

TECHNICAL FIELD

The present invention relates to the field of dehumidifiers in general, and in particular to a moisture collection apparatus that is equipped with an internal water vapor barrier that prevents any significant amount of water from being reabsorbed by the collection medium.

BACKGROUND ART

As can be seen by reference to the following U.S. Pat. Nos. 2,556,910; 3,050,920; 2,680,355; and 2,306,674; the prior art is replete with myriad and diverse humidifying and dehumidifying apparatus for maintaining a desired level of humidity in a given environment.

While all of the aforementioned prior art constructions are more than adequate for the basic purpose and function for which they have been specifically designed, these patented constructions particularly with regard to the dehumidifying devices do not adequately provide for the isolation of the accumulated moisture once the absorbing medium has become saturated.

Once this state of saturation has been attained with the prior art systems, the moisture absorbing medium merely recirculates moisture into the air since it has reached a state of equilibrium.

As a consequence of the foregoing situation, there has existed a longstanding need for a new type of moisture collection apparatus that will interpose a moisture barrier between the absorbing medium and a fluid reservoir, such that absorbed liquid will flow by gravity into the liquid reservoir, while being substantially prevented from being re-absorbed by the absorbing medium; and, the provision of such a construction is a stated objective of the present invention.

DISCLOSURE OF THE INVENTION

Briefly stated, the improved moisture collection apparatus that forms the basis of the present invention comprises; a liquid collection unit; a vapor barrier unit; a screened receptacle unit; and an absorbent medium.

The liquid collection unit includes a lower waterproof housing member; wherein, the screened receptacle unit includes an upper screened housing member.

In addition, the vapor barrier unit, comprises a notched and recessed vapor plate member suspended below the upper screened housing member; and, equipped with a central aperture which allows water to flow into the lower housing member.

As will be explained in greater detail further on in the specification, the presence of the vapor plate member allows the water absorbed by the absorbent medium to fall by gravity onto the sloped walls of the vapor plate member and to drop through the central aperture into the liquid collection unit.

Once the water is contained within the liquid collection unit only a very small portion of the surface area of the absorbent material is exposed to the collected water for re-absorption, which will substantially prolong the useful life of the absorbent medium.

BRIEF DESCRIPTION OF THE DRAWINGS

These and other attributes of the invention will become more clear upon a through study of the following description of the best mode for carrying out the invention, particularly when reviewed in conjunction with the drawings, wherein.

BEST MODE FOR CARRYING OUT THE INVENTION

Figures 1, 2:
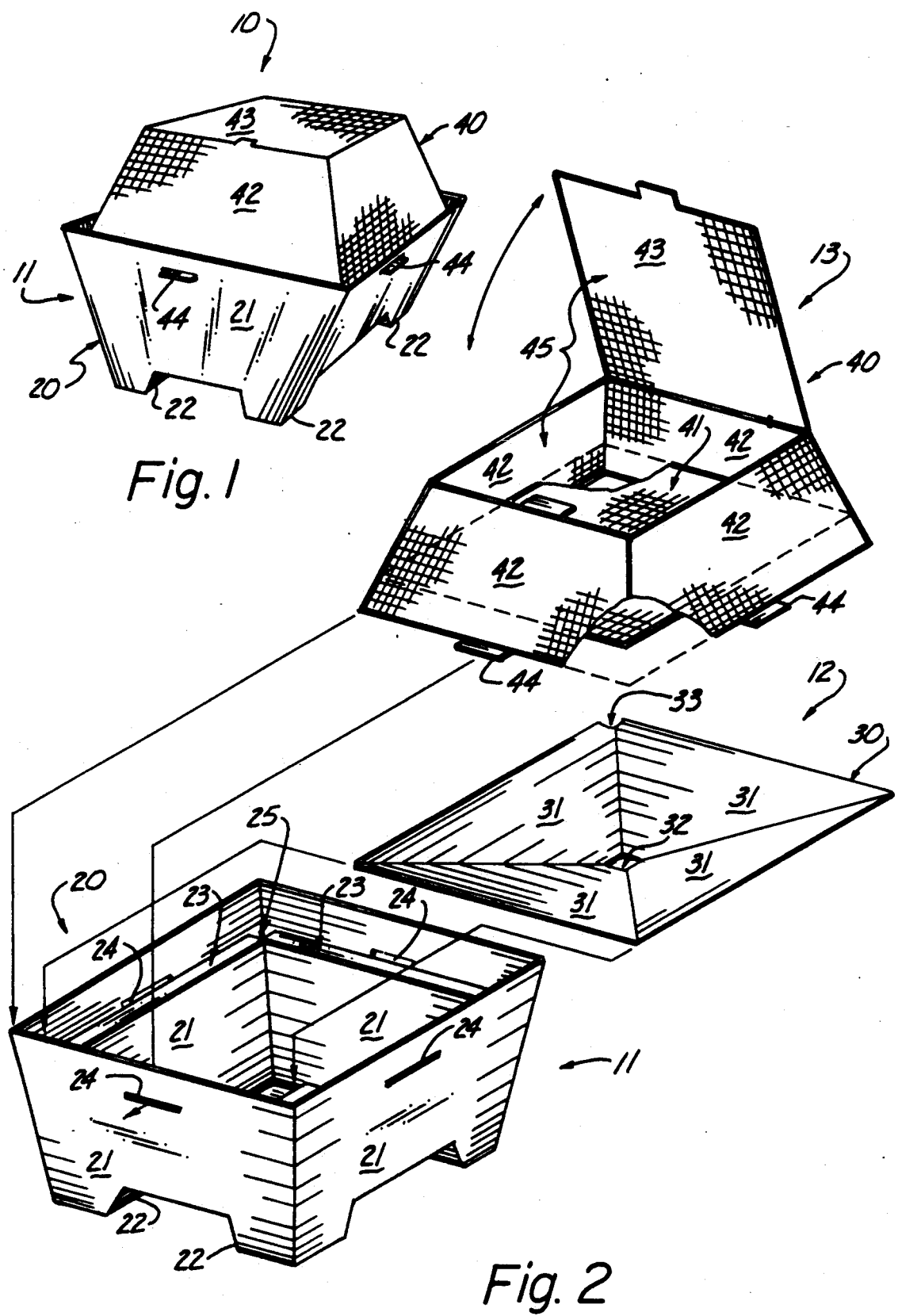
FIG. 1 is a perspective view of the moisture collection apparatus.
FIG. 2 is an exploded perspective view of the apparatus.
Figure 3:
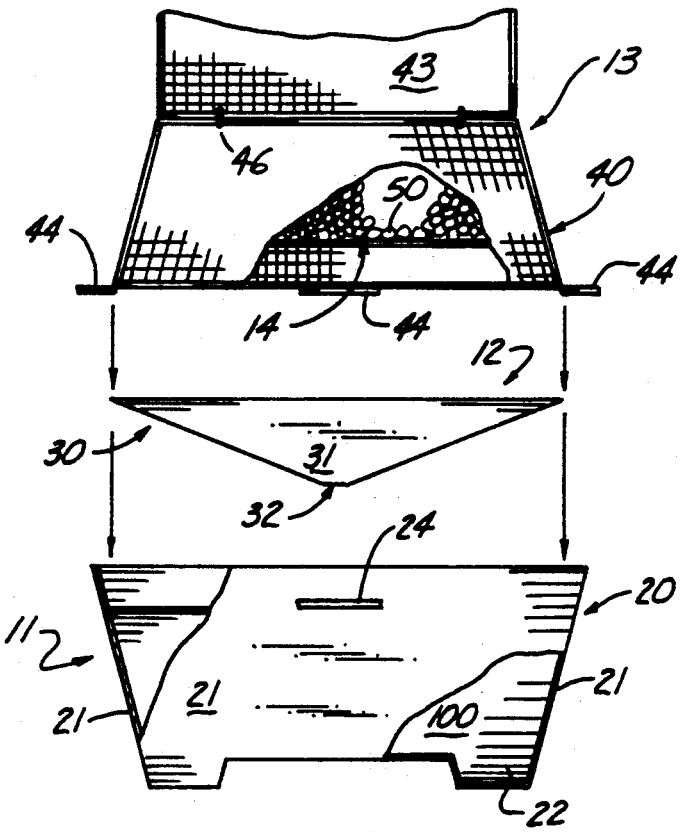
FIG. 3 is a front exploded elevation view of the apparatus.

As can be seen by reference to the drawings, and in particular to FIG. 1, the improved moisture collection apparatus that forms the basis of the present invention is designated generally by the reference numeral (10) as shown in FIGS. 2 and 3. The apparatus (10) comprises in general; a liquid collection unit (11); a vapor barrier unit (12); a screened receptacle unit (13); and, an absorbent medium (14).

As can best be seen by reference to FIGS. 1 through 4, the liquid collection unit (11) comprises a generally rectangular waterproof lower housing member (20) having outwardly angled side walls (21); and, optionally provided with a plurality of leg elements (22).

In addition each of the interior surfaces of the side walls (21) are provided both with an inwardly directed discrete shelf element (23) which is disposed proximate to, but spaced from, the top of each side wall (21); and, a centrally located slot (24) which is disposed proximate to, and above each of the shelf elements (23).

Furthermore each of the shelf elements (23) extend almost the entire width of each of the side walls (21) with the exception of a small drainage notch (25) shown in FIG. 2, that is formed at the juncture of at least two of the shelf elements (23).

Figure 5:
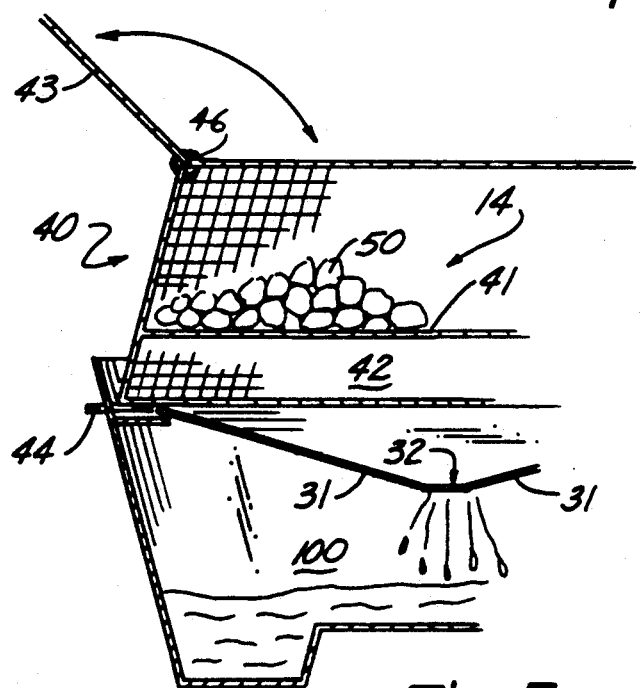
FIG. 5 is a partial cross-sectional view of the apparatus.

Turning now to FIGS. 2, 3 and 5, it can be seen that the vapor barrier unit (12) comprises a generally rectangular plate member (30) having: inwardly and downwardly angled side walls (31); an opening (32) formed at the lowest point on the recessed plate member (30); and, at least one drain notch (33) formed on one of the corners of the plate member (30); such that the drain notch (33) may be aligned with at least one of the notches (25) on the lower housing member (20).

Figure 4:
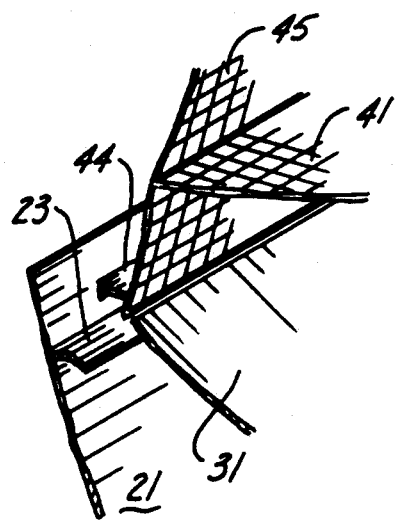
FIG. 4 is an enlarged detail view of the interior of the apparatus.

As can best be appreciated by reference to FIGS. 2, 4 and 5, the recessed plate member (30) is dimensioned, so that the edges of the plate member (30) will rest on, and be supported by the shelf elements (23) of the lower housing member (20); such that the vapor barrier unit (12) will be suspended within the liquid collection unit (11).

Turning now to FIGS. 2, 3 and 5, it can be seen that the screened receptacle unit (13) comprises: a generally rectangular screened upper housing member (40) having a raised floor element (41) inwardly angled side wall elements (42) and a hinged lid element (43) all fabricated from an open mesh material (45); wherein, the lid element (43) is operatively connected to one of the side wall elements (42) via a pair of hinge elements (46).

In addition the bottom edges of each of the side wall elements (42) are further provided with outwardly projecting tabs (44) which are dimensioned to be received in the slots (24) formed in the lower housing member (20); such that the upper housing member (40) will be supported by the lower housing member (20), in a well recognized fashion.

As can best be seen by reference to FIGS. 3 and 5, the absorbent medium (14) comprises calcium chloride crystals (50) or other suitable water absorbing material which has a particle size greater than the openings in the mesh material (45); such, that the absorbent crystals will be held captive within the confines of the screened receptacle unit (13), as the crystals (50) remove moisture from the air.

As the crystals approach a state of saturation, the absorbed moisture will tend to migrate by gravity downwardly within the mass of crystals (50) to be deposited onto the upper surface of the plate member (30); whereupon, the condensed droplets of water will flow through the aperture (32) in the plate member (30) to fall into the liquid reservoir (100) defined by the lower portion of the walls (21) of the lower housing member (20).

As can best be seen by reference to FIGS. 2 through 5, the side wall elements (42) project below the raised floor element (41) to create an open air circulation space between the bottom of the raised floor element (41) and the plate member (30) to minimize the chances that the crystal mass (50) will reabsorb the water vapor trapped between the plate member (30) and the liquid level within the lower housing member 20, and exposed to the crystal mass (50) through the central opening (32) in the plate member (30).

Once a sufficient amount of water has accumulated within the lower housing member (20) the apparatus (10) is tilted such that the collected water will flow through the notch (25) in the shelf elements (23), the notch element (33) in the plate member (30), and out of the lower housing member (20) without any potential contact with the crystal mass (50) in the screened upper housing member (40) due to the spacing of the raised floor element (41) relative to the top of the lower housing member (20).

Also, once the crystal mass (50) has accumulated a substantial amount of water over a long period of time, it will become necessary to replace the crystal mass (50) within the screened upper housing member (40). This is accomplished by opening the hinged lid (43) to remove the used crystals (50) and to refill the screened upper housing member (40) with a fresh crystal mass (50).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

What is claimed is:

1. A moisture collecting apparatus including a lower housing member defining a liquid reservoir and having a top;

a screened upper housing member having a hinged lid element, angled side wall elements and a floor element; wherein, said lid element said angled side wall elements and sad floor elements are fabricated from open mesh material; and, wherein said upper housing member is supported in said lower housing member above said liquid reservoir; wherein, the angled side wall elements extend below the level of the floor element to produce a raised floor element; disposed above the top of said lower housing member;

an adsorbent medium comprising a mass of crystals disposed within said upper housing member; and, a vapor barrier unit supported by the lower housing member, and interposed between the upper and the lower housing member; wherein, the vapor barrier unit is provided wit an aperture at the lowest point of said vapor barrier unit to allow accumulated condensed moisture to flow from said adsorbent medium by gravity through said aperture and into said liquid reservoir.

2. The apparatus as in claim 1; wherein, the vapor barrier unit further comprises a recessed plate member suspended within the lower housing member and provided with a drain notch disposed along at least one edge of the recessed plate member.

3. The apparatus as in claim 2; wherein, the interior of the lower housing member is provided with means for suspending the recessed plate member proximate to, but below the raised floor element of the upper housing member.

4. The apparatus as in claim 3; wherein, said means comprises at least two shelf elements projecting proximate to, but below the raised floor element of the upper housing member.

5. The apparatus as in claim 4; wherein, said means comprises at least two shelf elements projecting inwardly from the interior of the lower housing member.

* * * * *